United States Patent [19]

Osborne

[11] Patent Number: 4,749,935

[45] Date of Patent: Jun. 7, 1988

[54] ALTERNATOR AND CONTROLLED RECTIFIER FOR PRODUCING PULSE WIDTH MODULATED DC OUTPUT PULSES

[75] Inventor: Ewart T. Osborne, Duncraig, Australia

[73] Assignee: Unipower International Pty. Ltd., Australia

[21] Appl. No.: 894,056

[22] PCT Filed: Dec. 18, 1985

[86] PCT No.: PCT/AU85/00319

§ 371 Date: Aug. 26, 1986

§ 102(e) Date: Aug. 26, 1986

[87] PCT Pub. No.: WO86/03906

PCT Pub. Date: Jul. 3, 1986

[30] Foreign Application Priority Data

Dec. 21, 1984 [AU] Australia .................. PG8694

[51] Int. Cl.[4] .............. H02P 13/16; H02M 7/155
[52] U.S. Cl. .......................... 322/8; 219/133;
307/10 R; 307/16; 322/90; 363/36; 363/129
[58] Field of Search .................. 322/7, 8, 86–88,
322/90; 363/87, 129, 36, 89; 307/16, 84, 10 R;
219/133; 320/64

[56] References Cited

U.S. PATENT DOCUMENTS

| | | | |
|---|---|---|---|
| 3,032,700 | 5/1962 | Cecil et al. | 322/25 |
| 3,160,772 | 12/1964 | Miron | 322/90 |
| 3,329,883 | 7/1967 | Frierdich | 363/87 |
| 3,649,903 | 3/1972 | Fiedler | 322/90 |
| 3,668,514 | 6/1972 | Peck | 307/10 R |
| 3,763,398 | 10/1973 | Ragaly | 320/53 |
| 3,770,976 | 11/1973 | Stroud et a. | 219/133 |
| 3,890,557 | 6/1975 | Bogdanov et al. | 363/48 |
| 4,009,431 | 2/1977 | Johnson | 322/7 |
| 4,314,195 | 2/1982 | Muter | 322/90 |
| 4,395,673 | 7/1983 | Kurz | 363/129 |
| 4,517,507 | 5/1985 | Nordbrock et al. | 322/90 |
| 4,523,267 | 6/1985 | Mehl | 363/129 |
| 4,616,162 | 10/1986 | Radomski | 307/10 R |

FOREIGN PATENT DOCUMENTS

| | | |
|---|---|---|
| 153017 | 8/1951 | Australia . |
| 65766 | 6/1981 | Australia . |
| 70645 | 11/1981 | Australia . |
| 1513575 | 10/1969 | Fed. Rep. of Germany . |
| 2459309 | 6/1976 | Fed. Rep. of Germany . |
| 147711 | 11/1980 | Japan .................. 363/89 |
| 136932 | 10/1981 | Japan . |
| 1359929 | 7/1974 | United Kingdom . |
| 1574190 | 9/1980 | United Kingdom . |

*Primary Examiner*—William H. Beha, Jr.
*Attorney, Agent, or Firm*—Reising, Ethington, Barnard, Perry & Milton

[57] ABSTRACT

A regulated chopped DC power supply comprising an alternator with a stator and a rotor, the alternator having a three-phase winding for providing a high voltage output (1, 2, 3) and a star-connected three-phase winding for providing a low voltage output. Also included is a control circuit (14) for controlling a rectifier (12) which is connected to the high voltage output (1, 2, 3) of the alternator to produce a regulated chopped dc output (52) for powering electrical appliances. The control circuit (14) periodically interrupts the rectifier (12) at a frequency to interrupt substantially simultaneously all of the phases of the high voltage output.

10 Claims, 3 Drawing Sheets

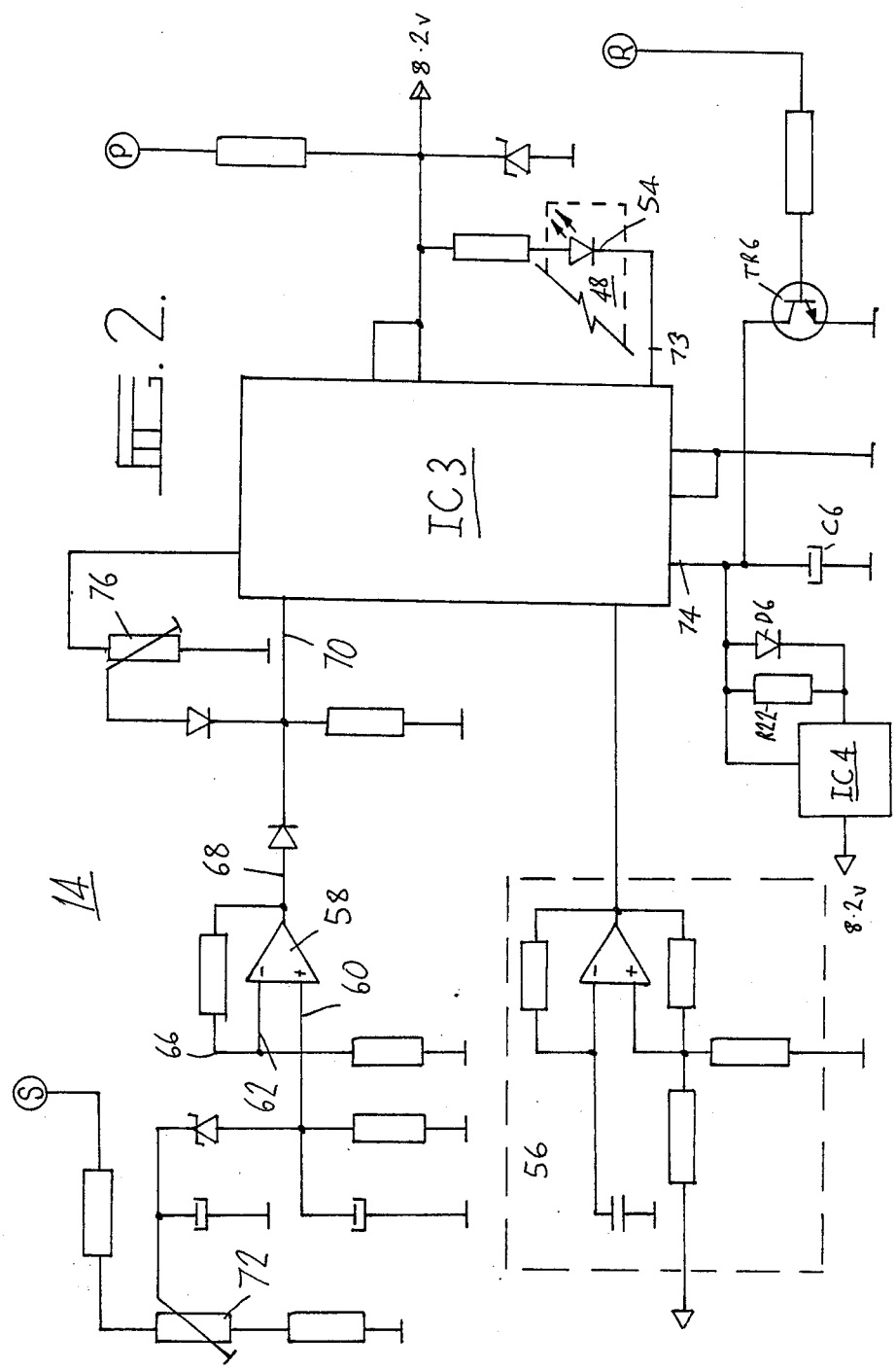

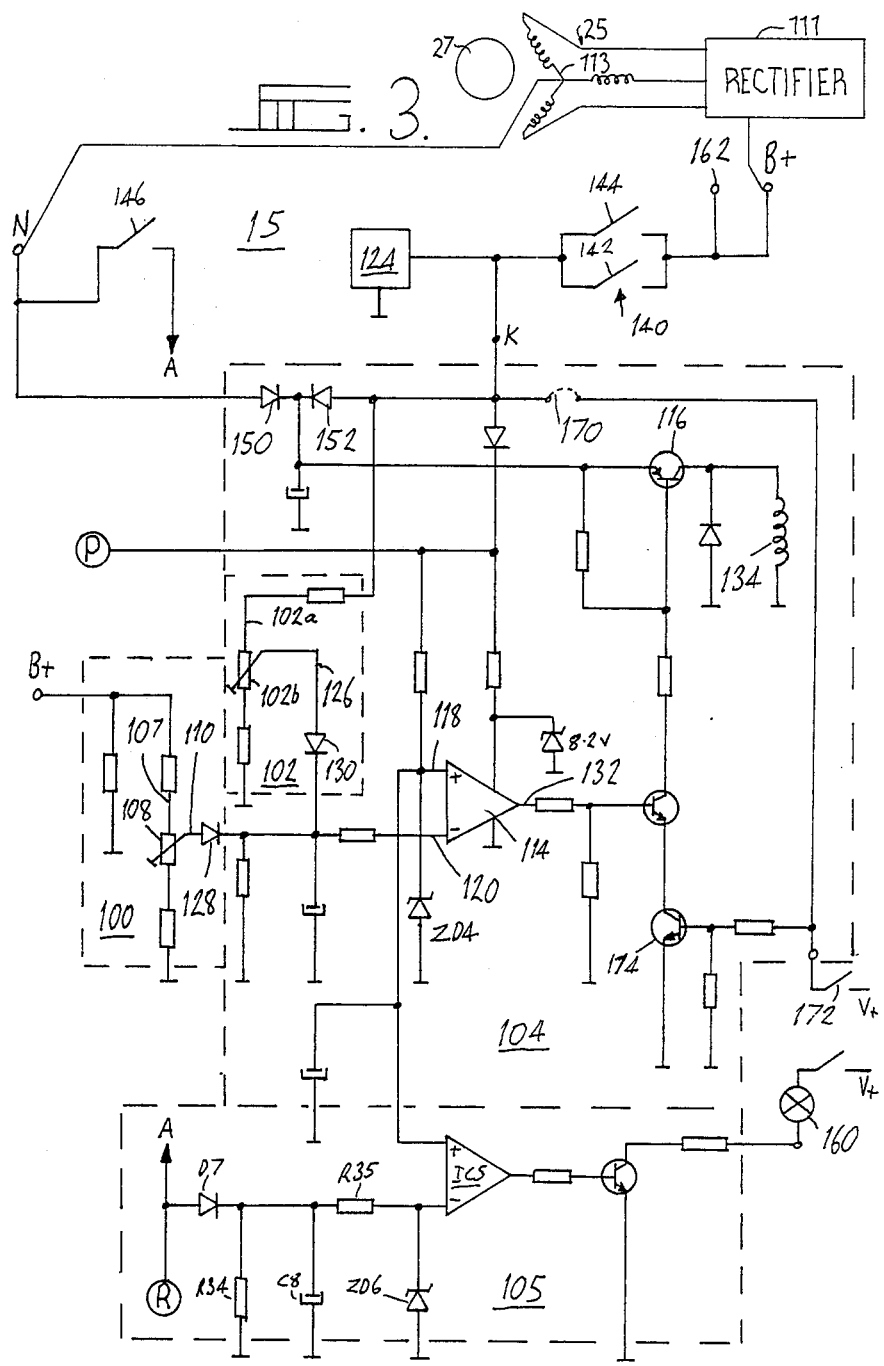

ALTERNATOR AND CONTROLLED RECTIFIER FOR PRODUCING PULSE WIDTH MODULATED DC OUTPUT PULSES

DESCRIPTION

The present invention relates to a regulated chopped DC power supply apparatus.

FIELD OF THE INVENTION

It is generally known that a vehicular alternator can be made with windings suitable to produce a power output capable of operating arc welding equipment. However, the current available from such windings is usually restricted by the size of the windings and the available space within a housing of the alternator and the battery potential used to excite a stator field winding of the alternator.

It is also generally known that certain AC powered appliances may be operated from DC power. However, switches used in AC appliances are usually not capable of switching DC power used to supply the AC appliance. Generally, if AC appliances are operated from DC power the switches in the appliances are quickly destroyed by arcing produced as the switch is operated. The destruction of AC switches by DC power is particularly prevalent where the AC appliance represents an inductive load to the supply of DC power.

SUMMARY OF THE INVENTION

The present invention provides a power supply apparatus which produces a relatively larger power output for a given size of winding and battery potential.

Also the present invention provides a regulated chopped DC power supply which results in substantially no arcing when loads are applied and/or removed from it.

In accordance with one aspect of the present invention there is provided a regulated chopped DC power supply apparatus characterised in that it comprises an alternator with a stator and a rotor, the alternator being wired to give a low voltage output and a high voltage output, a control means to commutate a rectifier means arranged to rectify the high voltage output from a high voltage winding of the alternator to produce a substantially direct current output at the high voltage output, wherein the high voltage direct current output is arranged to be interrupted periodically.

In accordance with a further aspect of the present invention there is provided a power supply apparatus, characterised in that it comprises an alternator with a stator and a rotor, the alternator being wired to comprise a star configuration winding arranged to give a low voltage output, the stator comprising a field winding arranged to be excited by power derived from a star point of the low voltage output star configuration winding.

BRIEF DESCRIPTION OF THE DRAWINGS

The present invention will now be described by way of example with reference to the accompanying drawings which constitute a circuit diagram of a regulated chopped DC power supply apparatus in accordance with the present invention, and in which:

FIG. 2 is a circuit diagram of a control means of the regulated chopped DC power supply apparatus of the present invention; and FIG. 3 is a circuit diagram of a regulator means of the regulated chopped DC power supply apparatus of the present invention.

DESCRIPTION OF THE INVENTION

Figure 1:
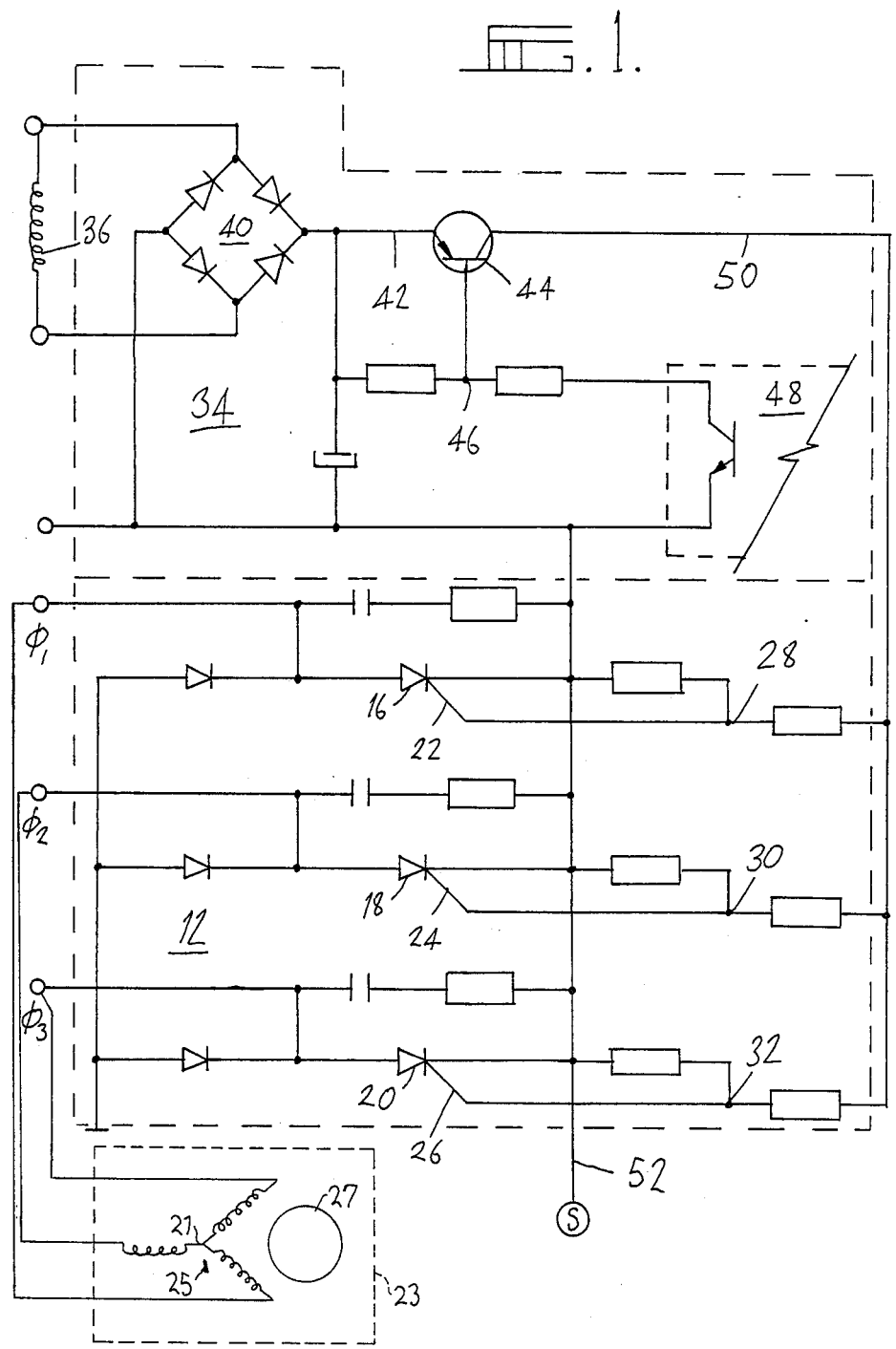
FIG. 1 is a circuit diagram of a rectifier means and a supply of power of the regulated chopped DC power supply apparatus of the present invention.

In the drawings there is shown a regulated chopped DC power supply apparatus comprising a rectifier means 12, a control means 14 and a regulator means 15. The rectifier means 12 comprises a conventional full wave high voltage bridge rectifier having half of the rectifier diodes replaced by a retriggerable switch means such as SCR's 16, 18 and 20 (silicon controlled rectifiers).

The rectifier means 12 has a three phase input comprising phase inputs $\phi_1$ $\phi_2$ and $\phi_3$. The inputs $\phi_1$, $\phi_2$, and $\phi_3$ are from a high voltage winding 21 of an alternator 23 in accordance with the present invention.

The SCR's 16, 18 and 20 are arranged in the rectifier means 12 to switch each of the phase inputs $\phi_1$, $\phi_2$ and $\phi_3$ respectively.

Each of the SCR's 16, 18 and 20 has a gate terminal, respectively assigned reference numerals 22, 24 and 26. Each of the gate terminals 22, 24 and 26 is biased by a voltage divider network 28, 30 and 32 respectively. The voltage divider networks 28, 30 and 32 are connected to a supply of power 34.

The supply 34 is derived from an auxiliary winding 36 of the alternator 23 and is rectified by a full wave bridge rectifier 40. The rectifier 40 has an output 42 which has substantially DC voltage. The output 42 is typically of the order of 5 to 10 volts DC above the voltage of the output of the rectifier means 12 described hereinafter.

The output 42 is switched by a switch means such as a transistor 44 having a biasing resistor pair 46. The transistor 44 is switched by an optical coupler 48. The transistor 44 has a collector output 50 which provides power to the voltage divider networks 28, 30 and 32.

As the optical coupler 48 is switched on and off the SCR's 16, 18 and 20 are in turn switched off and on. The optical coupler 48 can thus be used to control the period of time in which the phase inputs $\phi_1$, $\phi_2$, and $\phi_3$ are simultaneously interrupted.

The rectifier means 12 has an output 52 which carries chopped DC power. As shown in FIG. 1 the output 52 is connected to the high potential side of the full wave rectifier of the rectifier means 12.

The output 52 is intended to be connected to mains AC operable appliances, such as electric drills, lights, kettles and the like. The output 52 provides substantially DC power commutated by the rectifier means 12 and controlled by the opto coupler 48. The voltage of the output 52 is sensed by the control means 14 as shown in FIG. 2.

A photodiode 54 of the optical coupler 48 is controlled by the control means 14 to switch the optical coupler 48 on and off at a predetermined frequency or range of frequencies. The predetermined frequency of switching is set by an astable multivibrator 56. The predetermined frequency is in the range from 30 Hz to 500 Hz, preferably in the range from 50 Hz to 200 Hz, more preferably about 100 Hz.

The maximum allowable frequency of oscillation of the astable 56, to obtain useful performance, is dependent on the minimum frequency of the AC output from the alternator.

The duty cycle of the oscillation of the opto coupler 48 is controlled by an amplifier 58.

The amplifier 58 has a first input 60 having a voltage proportional to the voltage of the output 52. The amplifier 58 has a second input 62 with an associated voltage divider 66 which sets the voltage gain of the amplifier 58.

The amplifier 58 has an output 68 which has a voltage that is proportional to and amplified from the voltage of the input 60.

The output 68 is connected to a timing input 70 of a precision monostable timer IC3.

The output 68 has a voltage indicative of the average value of the voltage of the output 52.

When the average value of the voltage of the output 52 is at or above a predetermined voltage, as set by a potentiometer 72, a voltage appears at the output 68.

The voltage at the input 70 is used to vary the duty cycle of the switching of the optical coupler 48 which is connected to an output 73 of the timer IC3. The timer IC3 as used in this example is an LM 322.

A voltage regulator IC4, a diode D6, a resistor R22 and a capacitor C6 are provided at a timing input 74 of the timer IC3. The regulator IC4, and associated components provide a linear ramp so that a substantially linear relationship exists between the voltage at input 70 and the variation in the duty cycle of the switching of the optical coupler 48.

Thus, the opto coupler 48 oscillates at a frequency determined by the astable 56 and with a duty cycle substantially linearly variable in correspondence with the proximity of the voltage of the output 52 to a preset voltage.

The duty cycle of the switching of the opto coupler 48 has a minimum value set by a potentionmeter 76. The predetermined duty cycle is greater than 0%, preferably in the range from greater than 0% to 30% and most preferably in the range from 1% to 10% for example 10%. When the voltage of the output 52 is greater than the predetermined value the duty cycle of switching is increased, for example above the 5% value.

Therefore, the control means 14 provides a switching control at the opto coupler 48, wherein pulse width modulation of the opto coupler 48 is used to increase the off period of the SCR's 16, 18 and 20 when the voltage of the output 52 exceeds the predetermined value and to decrease the off period when the voltage is below the predetermined value.

The control means 14 acts, firstly, to periodically switch off the output 52. Thus, when an AC operable appliance is connected to the output 52 and switched on or off there is virtually no possibility of a spark forming to bridge the gap forming between contacts of a switch of the appliance. A spark is less likely to form since the brief cessation of power causes any charge build up to dissipate.

Where AC operable appliances are powered with DC power, electric charge builds up during switch on and switch off conditions. The charge build up results in a spark across switch contacts. Repeated spark leads to rapid deterioration of the switch which is undesirable. The apparatus of the present invention allows AC operable appliances to be reliably powered by DC power. Secondly, the control means 14 acts to control the voltage of the output 52 about a voltage set by the potentiometer 72. The regulator means 15 of the present invention, shown in FIG. 3, comprises a first sense means 100, a second sense means 102, a field regulator 104 and a display circuit 105.

The first sense means 100 is arranged to sense the voltage of a B+ output of the alternator. The sense means 100 comprises a voltage divider 107 comprising a potentiometer 108 and having an output 110.

The B+ output is connected via a low voltage full wave three phase rectifier 111 to a low voltage high current winding 113 in the alternator 23 and preferably has a STAR configuration.

Typically the B+ output has a voltage of between 10 to 60 volts as described hereinafter.

The B+ output is sensed by the first sense means 100 and the potentiometer 108 produces a voltage proportional to the voltage at the B+ output to the output 110.

The output 110 is fed into the field regulator 104. The field regulator 104 comprises a comparator 114 and a transistor 116. The comparator 114 has a first input 118 regulated by a zener diode ZD4 to a reference voltage such as 5 volts for example.

The comparator 114 has a second input 120 connected to both the first sense means 110 and the second sense means 102.

The second sense means 102 is provided to sense the voltage of a battery 124, connected to a terminal K, and used in conjunction with the power supply apparatus.

The second sense means 102 comprises a voltage divider network 102a comprising a potentiometer 102b. The second sense means 102 has an output 126 from the potentiometer 102b having on it a voltage proportional to the battery 124 voltage.

The outputs 110 and 126 are ORed together by diodes 128 and 130 and fed into the input 120 of the field regulator 112. When the second voltage exceeds the reference voltage an output 132 of the comparator 114 goes to a low voltage and the transistor 116 is biased off. The transistor 116 is connected to a field winding 134 of the alternator. When the transistor 116 is turned off the field winding 134 is de-energised. Consequently the voltage output by the alternator reduces and the voltage sensed by the first sense means 100 and/or the second sense means 102 decreases toward a reference value set by the potentiometers 108 and/or 102b respectively. The field regulator thus serves to keep the low voltage weld output 162, described hereinafter, and the voltage of the battery 124 below a preset maximum value. The power supply apparatus also comprises a mcde switch 140 having contact components 142, 144 and 146. The contact components 142 and 144 are wired in parallel combination to provide for a large current carrying capability. The contact components 142 and 144 provide conduction, when closed, from the low voltage high current winding 113 of the alternator to the battery 124, when the switch 140 is in a first mode conveniently referred to as a car mode.

The low voltage high current winding 113 is wound in a STAR configuration and has a star point. The star point is connected to an input N of the regulator means 15.

The input N is ORed with the terminal k by diodes 150 and 152 respectively to provide power to the transistor 116 and thence to the field winding 134.

When in the car mode the low voltage winding is connected to the battery 124 and via diode 152 and transistor 116 to the field winding 134. The voltage across the field winding 134 is thus at most approximately the voltage of the battery. Accordingly, the energy in the stator 25 induces energy in the rotor 27 which results in voltage on the low voltage winding 113 approximately equal to the voltage of the battery 124. Also, the star point has a voltage approximately half that of the low voltage winding, that is between about 5-7 volts where the voltage of the battery 124 is 12 volts. Thus, the diode 150 is reverse biased and does not conduct.

In the car mode, it is intended that a vehicle having the power supply apparatus fitted be driven in known manner. It is further intended that no welding or operation of mains voltage AC appliances be conducted in the car mode. A transistor TR6 is provided to disable the ramp (described hereinabove) of the control means 14 to disable the high voltage output 152 in the car mode.

The contact 146 of the switch 140 is connected between the star point input N and the display means 105 at contact A. The voltage of the contact A is sensed by a comparator IC5 and associated noise suppression circuitry ZD6, C8, R34 and R35. The comparator operates to have a low output, when the contact 146 is closed in the car mode, to extinguish an alternator charge warning lamp 160. In the car mode the regulator means 15 is controlled by the second sense means 102 since the first sense means 100 is set to sense a voltage at the B+ output in the vicinity of 40 to 60 volts DC.

The switch 140 may also be moved to a mode conveniently referred to as a power mode. In the power mode the battery 124 is not charged and the B+ output is supplied for welding purposes at a weld output 162. The weld output 162 is suitable for performing arc welding, auxiliary battery charging or "jump" starting of other engines.

In the power mode the contact 146 is open and the output of the comparator IC5 is high and the lamp 160 is lit. The B+ output is no longer tied to the voltage of the battery 124 and is sensed by the first sense means 100 which is set to activate the comparator 114 when the B+ output voltage exceeds a voltage between about 40 to 60 volts. Until this occurs the field winding 134 is supplied with power from the star point input N via the diode 150 and transistor 116.

The B+ output voltage, the star point input N voltage and the field winding voltage will thus increase until the B+ output voltage exceeds the preset value and deactivates the comparator 114 and hence the transistor 116 to remove power from the field winding 134.

In the power mode when the B+ output of the alternator is under full load conditions, such as during arc welding, the output voltage is between about 20 to 30 volts DC. Under these conditions the regulator means 15 is unable to regulate the low voltage output to the reference value set by the potentiometer 108. Thus, the field winding 134 is driven hard on and the alternator B+ output is at a maximum.

It has been discovered that under full load conditions the star point input N is between about 15 to 18 volts.

That is the star point input N even under full load conditions, is still able to power the field winding 134 at a voltage greater than the battery 124 voltage.

Therefore, the B+ output of the alternator is maintained at a power greater than that available from the battery 124, under conditions of no load and full load when in the power mode. In this manner a voltage substantially greater than battery voltage is available to drive the field winding 134. Such relatively high field voltage produces larger current output from the low voltage winding for welding than is otherwise the case.

The voltage of the B+ output and the battery 124 is sensed by sense means 100 and 102 respectively. If the sensed voltage is lower than the reference voltage the transistor 116 is turned hard on and power applied to the field winding 134 to increase the alternator output voltage.

In the car mode the output 162 is connected to charge the battery 124. The lamp 160 acts as a conventional ignition warning lamp.

In the power made the output 162 is not connected to the battery 124 and is available for arc welding and the like. The lamp 160 is illuminated to alert an operator that no charge is available for use in either mode. A link 170 is provided for use with vehicles having isolation diodes arranged to prevent flow of power from the battery 124 to the transistor 116. In such a case power is supplied via an ignition switch 172 of the vehicle. In normal circumstances, where no such diodes exist, the link 170 is removed.

The ignition switch 172 is connected to a transistor 174 configured to disable the regulator means 15 in the event that the ignition switch 172 is in an off condition.

In use, the rectified chopped DC power supply apparatus 10 of the present invention is connected into an electrical system such as that of a boat, land vehicle or stationary engine, and is intended to replace the alternator and regulator of the electrical system. The apparatus 10 produces mains voltage chopped DC power and weld power plus vehicular battery charging power. The apparatus 10 can be used to power suitable AC appliances from the chopped DC power source. The weld output 162 may be used for DC welding, for supplying high current for battery charging or "jump" starting other engines.

During operation of the engine or the like associated with the electrical system, the battery is charged in a regulated manner.

It is envisaged that where the power supply apparatus is arranged to supplement an existing alternator of an engine further contacts of the switch 140 could be arranged between the terminal K and the second sense means 102 to remove the likelihood of discrepancy in the regulation voltage of the engine's regulator and the regulator means 15 resulting in false de-energising of the field winding 134.

It is also envisaged that a further auxiliary winding could be provided to charge the battery 124 when operation is in the power mode.

Modifications and variations such as would be apparent to a skilled addressee are deemed within the scope of the present invention.

I claim:

1. A regulated chopped DC power supply apparatus comprising an alternator with a stator and a rotor, said stator having a high voltage winding of the mulit-phase type, said high voltage winding having a similarly multi-phased high voltage alternating current output, a switchable rectifier means connected to said phases of the high voltage alternating current output to produce direct current in a single mains voltage direct current output, said rotor having a field winding, and a control means connected to said switchable rectifier means to cause periodic interruption of said switchable rectifier means at a frequency to interrupt substantially simultaneously all of the phases of said high voltages alternating current output to produce a substantially single phase direct current at said mains voltage direct current output, said control means being configured to interrupt said switchable rectifier means at a duty cycle which varies from a minimum where the voltage at said mains voltage direct current output has a voltage less than a desired voltage to a maximum where the voltage at said mains voltage direct current output has a voltage greater than said desired voltage.

2. A regulated chopped DC power supply apparatus according to claim 1, comprising a supply of DC power having a low potential terminal and a high potential terminal, said low potential terminal being connected to said mains voltage direct current output, said switchable rectifier means comprising a semiconductor switch means for each phase of said high voltage alternating current output, each of said semiconductor switch means having a control gate and said high potential terminal being connected via said control means to each of said control gates of said semiconductor switch measn, said control means being configured to vary the voltage from the supply of DC power at said control gates between first and second conditions, the voltage at said control gates in said first condition being substantially the same as said mains voltage direct current output and the voltage at said control gates in said second condition being greater than the voltage of said mains voltage direct current output, said first condition causing interruption of said switchable rectifier means and said second condition causing conduction of said switchable rectifier means.

3. A regulated chopped DC power supply apparatus according to claim 1, in which said control means comprises first means to control the frequency of interruption of said switchable rectifier means and second means to vary the duty cycle of said interruption of the switchable rectifier means.

4. A regulated chopped DC power supply apparatus according to claim 1, in which said control means comprises means to regulate the voltage of said mains voltage direct current output to a value about a desired voltage by causing interruption of said switchable rectifier means at a duty cycle linearly variable with the relation of the substantially direct current to said desired voltage.

5. A regulated chopped DC power supply apparatus according to claim 1, comprising a low voltage alternating current output, a further rectifier means connected to said low voltage alternating current output to produce a low voltage direct current output and a regulator means connected to said low voltage alternating current output to regulate the voltage thereof below a predetermined maximum value in a further condition of operation, and said regulator means being arranged to regulate indirectly the voltage of said mains voltage direct current output by monitoring the voltage of said low voltage direct current output and modulating the voltage at the field winding of the alternator in accordance with the monitored voltage.

6. A regulated chopped DC power supply apparatus according to claim 3, in which said second means periodically interrupts said switchable rectifier means at a duty cycle in the range from 1% to 50%.

7. A regulated chopped DC power supply apparatus according to claim 3, in which said second means periodically interrupts said switchable rectifier means at a duty cycle in the range from 1% to 10%.

8. A regulated chopped DC power supply apparatus according to claim 3, in which said first means controls the frequency of interruption of said switchable rectifier means to a frequency in the range from 30 Hz to 50 Hz.

9. A regulated chopped DC power supply apparatus according to claim 3, in which said first means controls the frequency of interruption of said switchable rectifier means to a frequency in the range from 50 Hz to 200 Hz.

10. A regulated chopped DC pwer supply apparatus according to claim 5, comprising a battery or other source of DC electrical power and in which the high voltage winding is wound in a star configuration winding having a star point, said star point being connected to said switchable regulator means, and said regulator means comprising switch means to switch between a condition of operation in which the field winding is excited and driven by power substantially at or below battery voltage and derived from the battery or other source of DC electrical power and a condition of operation in which said field winding is excited and driven by power derived from the star point, the voltage of the power derived from said star point being substnatially greater than the voltage of the power derived from the battery.

* * * * *